United States Patent [19]
Maeda et al.

[11] Patent Number: 6,161,672
[45] Date of Patent: Dec. 19, 2000

[54] SHIFT-LOCKING DEVICE FOR A VEHICLE TRANSMISSION

[75] Inventors: Hiroaki Maeda, Toyoto; Yuki Tojima, Aichi-ken; Shigeki Banno, Chiryu, all of Japan

[73] Assignee: Aisin Seiki Kabushiki Kaisha, Kariya, Japan

[21] Appl. No.: 09/404,793

[22] Filed: Sep. 24, 1999

[30]  Foreign Application Priority Data

Sep. 25, 1998  [JP]  Japan ................................ 10-270761

[51] Int. Cl.⁷ ............................ B60K 41/28; B60K 41/26
[52] U.S. Cl. ......................................... 192/220.2; 477/96
[58] Field of Search ............................ 192/220.2, 220.3; 477/96, 99, 115

[56]  References Cited

U.S. PATENT DOCUMENTS

| | | | |
|---|---|---|---|
| 4,572,340 | 2/1986 | Pierce | 192/220.2 |
| 5,566,583 | 10/1996 | Suzuki | 477/99 X |
| 5,685,405 | 11/1997 | Morikawa et al. | 477/96 X |
| 5,996,763 | 12/1999 | Tsuge | 192/220.3 |

FOREIGN PATENT DOCUMENTS 6-265011  9/1994  Japan .
8-285056  11/1996  Japan .

OTHER PUBLICATIONS

Toyota Avalon Manual, May 9, 1999, pp. 2–17.

Die neue A–Klasse von Dimler–Benz (Senderausgabe ATZ and MTZ). (Not Dated).

Primary Examiner—Rodney H. Bonck
Attorney, Agent, or Firm—Burns, Doane, Swecker & Mathis, LLP

[57]  ABSTRACT

A shift-locking device for a vehicle transmission includes a manual shaft mechanically connected with a shift lever for rotating to a first position, a second position and a third position through operation of the shift lever, and mechanically connected to a parking control mechanism disposed in the transmission case. A first shift-locking shaft is connected to a brake pedal for rotating from a first position to a second position, and a locked member is provided on the manual shaft. A first lock member provided on the first shift-locking shaft is adapted to engage the locked member when the first shift-locking shaft is in the first position. A spring urges the first shift-locking shaft to the second position to release engagement between the locked member and the first lock member.

20 Claims, 11 Drawing Sheets

SHIFT-LOCKING DEVICE FOR A VEHICLE TRANSMISSION

This application is based on and claims priority under 35 U.S.C. § 119 with respect to Japanese Application No. 10(1998)-270761 filed on Sept. 25, 1998, the entire content of which is incorporated herein by reference.

FIELD OF THE INVENTION

The present invention generally relates to vehicle transmissions. More particularly, the present invention pertains to a shift-locking device for a vehicle transmission.

BACKGROUND OF THE INVENTION

Vehicles having an automatic transmission and electrical vehicle having a electric motor are set up with several shift lever positions including at least a parking position, a reverse position and a drive position. A shift-locking device is provided for preventing the vehicle from suddenly starting when the shift lever is in the drive position or reverse position.

One known form of an electrical shift-locking device is described in the new model manual for the Toyota Avalon issued in May 9, 1999, page 2–17. This electrical shift-locking device is operated by a solenoid and is disposed inside a shift lever device. The shift-locking device controls a solenoid to input an electrical signal upon application of the brake pedal and an electrical signal upon operation of the ignition key to the start position. Accordingly, the shift lever cannot not be shifted from the parking position unless the brake pedal is applied and the ignition key is operated to the start position.

A mechanical shift-locking device is described in Japanese Laid-Open application No. Hei 6-265011. This mechanical shift-locking device is operated by a cable which is connected to a key cylinder of an ignition key and is disposed inside of a shift lever device. Accordingly, the shift lever cannot shift from the parking position unless the brake pedal is applied and the ignition key is operated to the start position.

Another structural mechanical shift-locking device is described in "Die neue A-Klasse von Dimler-Benz (Senderausgabe ATZ and MTZ)". This mechanical shift-locking device is operated by a cable and is attached to a parking control device connected to a manual shaft which rotates in correspondence to the shift lever. The parking control device has a detent mechanism for maintaining the rotated position of the manual shaft.

However, the electrical shift-locking device mentioned above is expensive because it requires relatively high priced elements, for example a computer, a solenoid and the like. Furthermore, this device requires a manual shift-locking release device distinguishable from the electrical shift-locking device so that it is possible to release the shift-locking when an electrical element becomes broken or unoperational. The need for this mechanical shift-locking device makes the device as a whole more expensive. Also, that the electrical shift-locking device can be released from shift-locking inside the vehicle has an effect of reducing the prevention of vehicle theft.

The first mechanical shift-locking device mentioned above is cheaper than the electrical shift-locking device. However, the mechanical shift-locking device can release the shift-locking inside the vehicle and so the effect of preventing vehicle theft is once again reduced.

The other mechanical shift-locking device is once again cheaper than the electrical shift-locking device and, in this case, the mechanical shift-locking device cannot release the shift-locking inside the vehicle. Thus, the effect of preventing vehicle theft is increased. However, because the shift-locking device is attached to the parking control device, it requires a relatively large space to install the device. Accordingly, the size of the transmission is enlarged.

In light of the foregoing, a need exists for a shift-locking device for a vehicle transmission that is not as susceptible to the problems mentioned above.

A need also exists for a shift-locking device for a vehicle transmission that is low in cost, is able to increase vehicle theft prevention, and results in a compact transmission.

SUMMARY OF THE INVENTION

According to one aspect of the invention, a shift-locking device for a vehicle transmission includes a manual shaft mechanically connected with a shift lever for rotating to a first position, a second position and a third position through operation of the shift lever, wherein the manual shaft is mechanically connected to a parking control mechanism disposed in the transmission case. A first shift-locking shaft is connected to a brake pedal for rotating from a first position to a second position, and a locked member is provided on the manual shaft. A first lock member provided on the first shift-locking shaft is adapted to engage the locked member when the first shift-locking shaft is in the first position. A spring urges the first shift-locking shaft to the second position to release engagement between the locked member and the first lock member.

In the present invention, the main components of the shift-locking device for a vehicle transmission are the first shift-locking shaft, the first lock member, the locked member, and the spring formed on the manual shaft. This results in a shift-locking device that is not excessively expensive because the device is mechanical. It is also possible to produce the shift-locking device without being excessively large because the device is isolated from the parking control mechanism, and the space needed generally only requires the space for two shafts. Further, the prevention of vehicle theft is increased because the device attaches to the transmission.

According to another aspect of the invention, a shift-locking device for a vehicle transmission includes a manual shaft connected with a parking control mechanism and rotatably installed on a transmission case and connected to a shift lever for rotating between a first position, a second position and a third position through operation of the shift lever between a parking position, a reverse position and a drive position. A shift-locking shaft is connected to either the brake pedal or the key cylinder for rotating from a first position to a second position upon operation of the brake pedal or the key cylinder. A locked member is provided on the manual shaft, and a lock member provided on the shift-locking shaft is adapted to engage the locked member when the shift-locking shaft is in the first position. A spring is operatively associated with the shift-locking shaft to urge the shift-locking shaft towards one of the first and second positions.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE PREFERRED EMBODIMENTS

Figure 1:
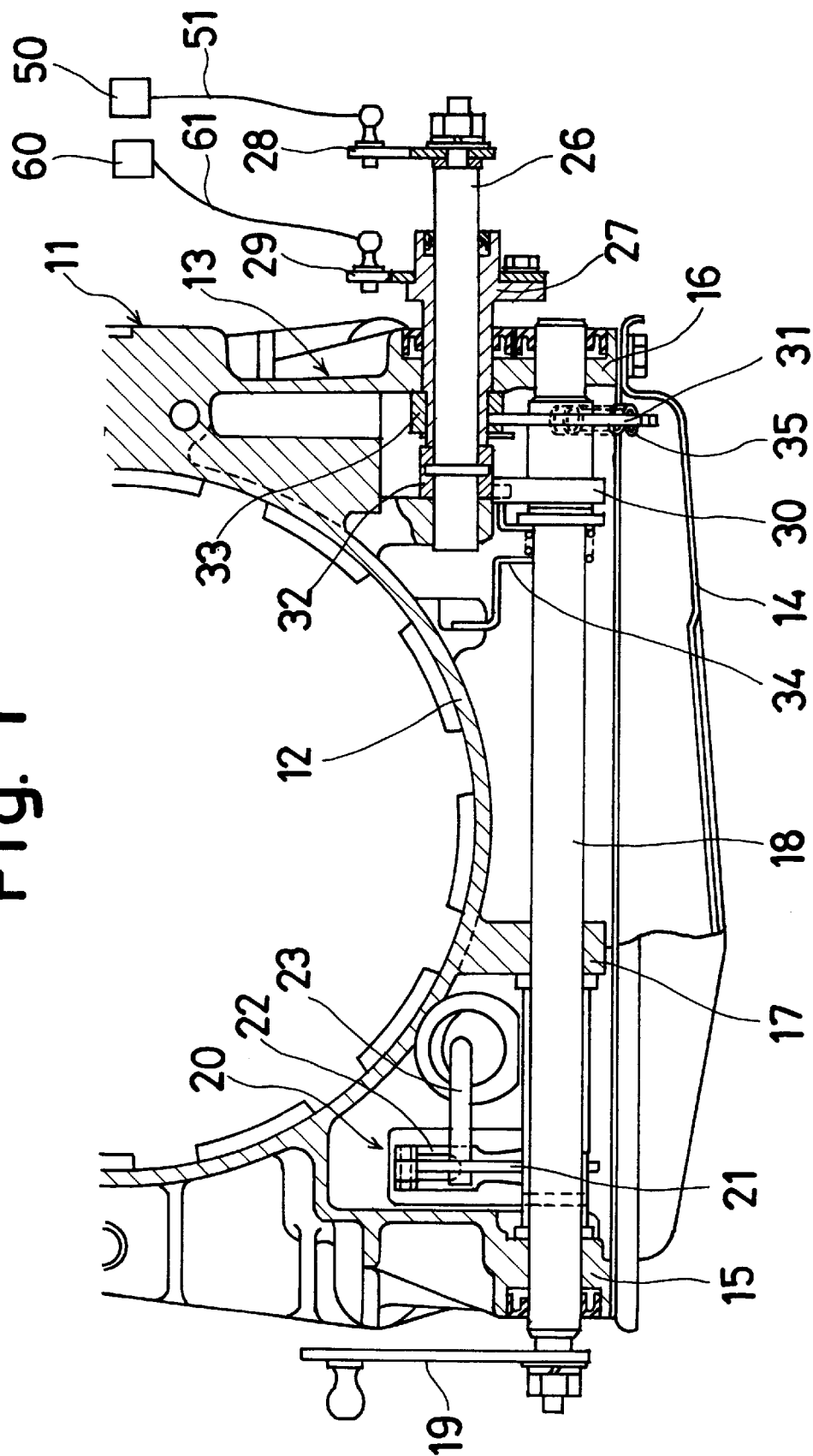
FIG. 1 is a cross-sectional view of a first embodiment of the shift-locking device according to the present invention.
Figure 2:
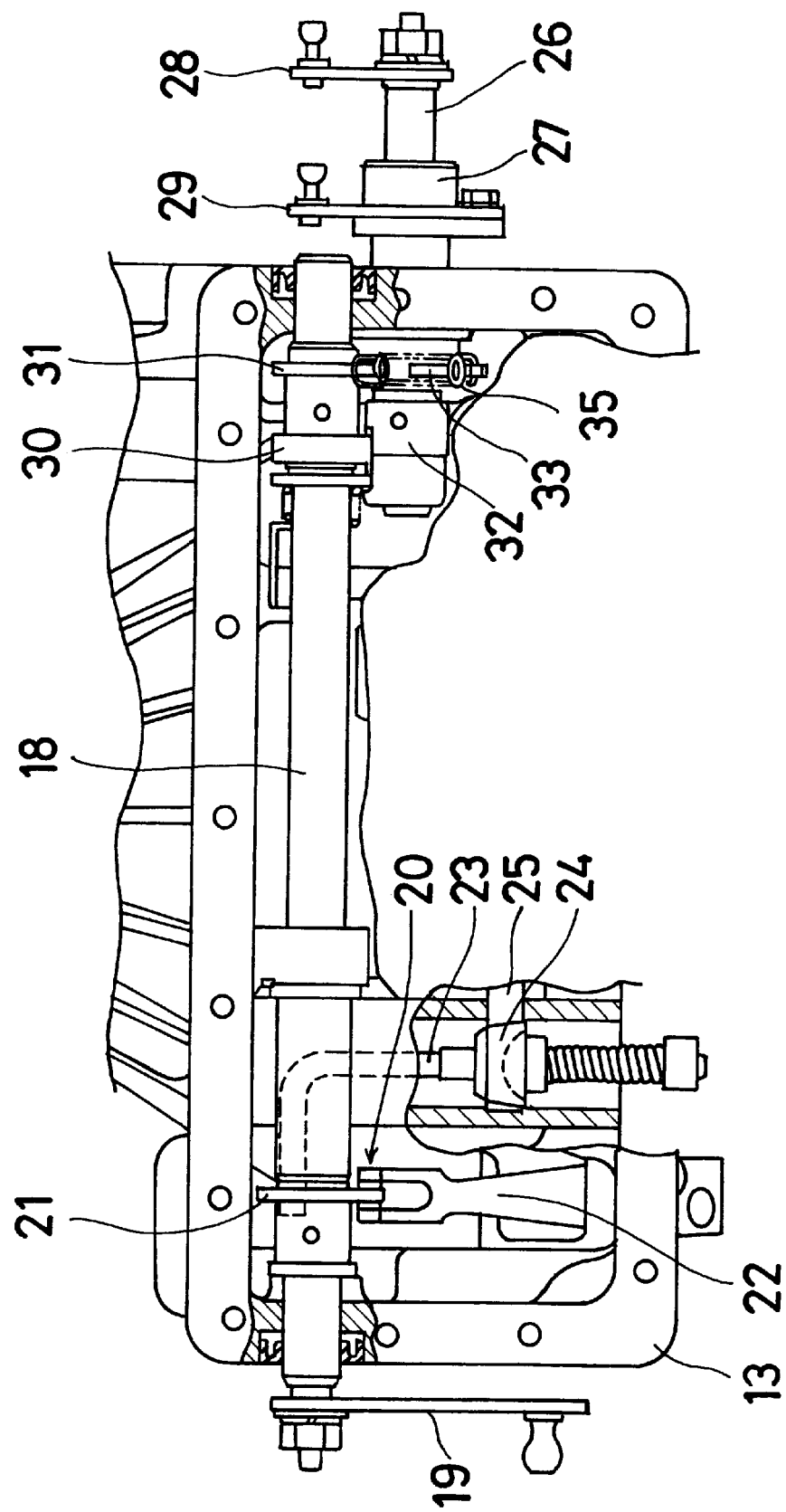
FIG. 2 is a bottom view of the shift-locking device in FIG. 1 with the oil pan removed.

A shift-locking device according to a first embodiment of the present invention is shown in FIGS. 1–6. With reference initially to FIG. 1 and FIG. 2, a transmission case 11 has an integrally formed oil pan attaching part 13 for attaching an oil pan 14. The oil pan 14 is adapted to be attached below a cylindrical portion 12 for holding a rotation shaft or a gear. Both ends of a manual shaft 18 are located in the oil pan attaching part 13 and are rotatably supported by respective side walls 15, 16 of the oil pan attaching part 13. The center part of the manual shaft 18 is rotatably supported by a downwardly extending supporting portion 17 that projects from the cylindrical portion 12.

Figure 3:
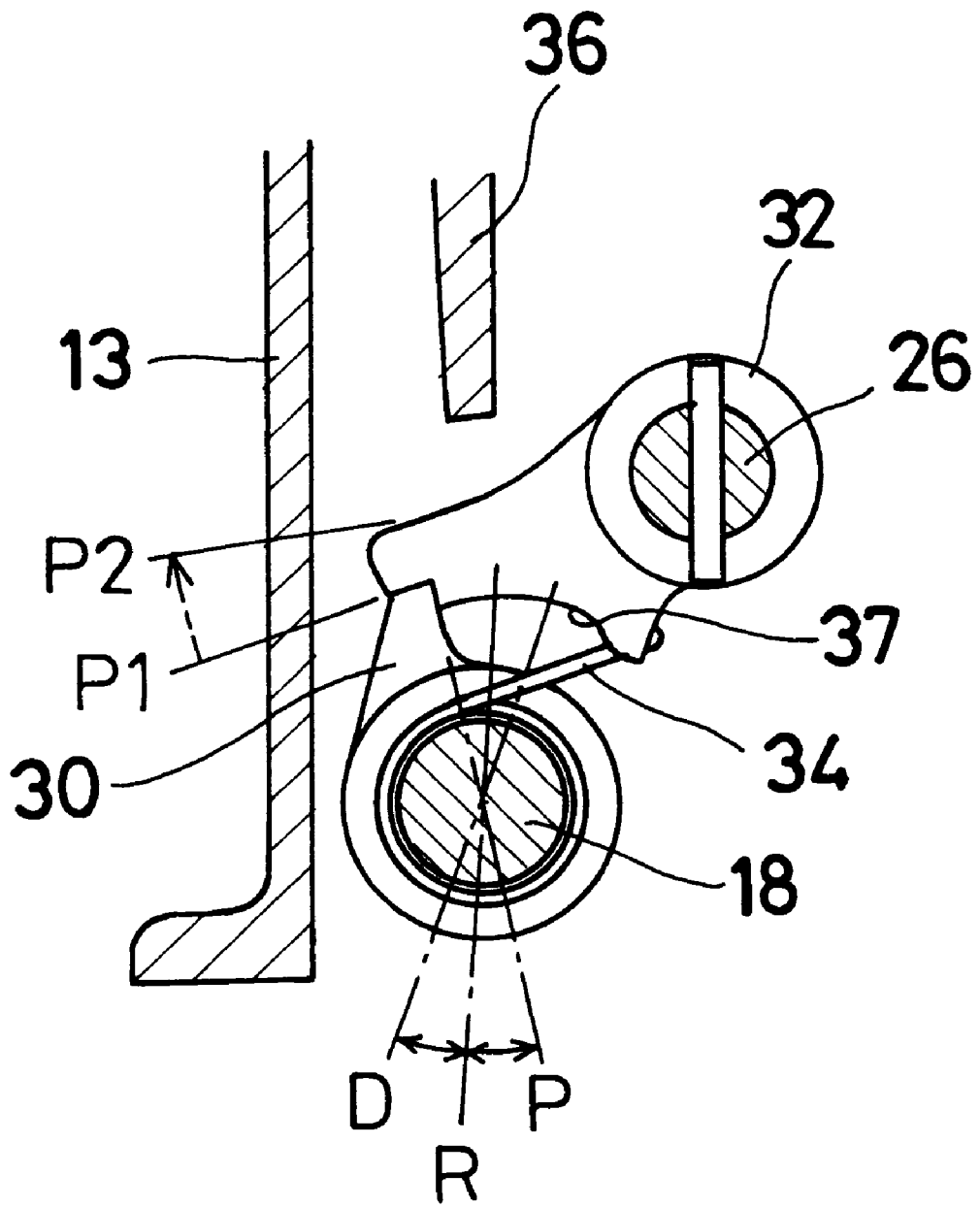
FIG. 3 is a cross-sectional view showing the engagement condition between the locked member and the lock member associated with the shift-locking shaft.

The end of the manual shaft 18 that projects to the outside through the side wall 15 is engaged with a manual shift lever 19 so that the two rotate together. The free end of the manual shift lever 19 is connected mechanically with a shift lever (not shown) in the car through a cable (not shown). The manual shaft 18 rotates between the positions P, R and D as shown in FIG. 3 and is accompanied by the shifting of the shift lever between the parking position, the reverse position and the drive position respectively.

A parking control mechanism 20 is located inside the oil pan attaching part 13 near the side wall 15. The parking control mechanism 20 is composed of a detent lever 21 that engages the manual shaft 18 to rotate together, a detent spring 22 in which one end hangs at the oil pan attaching part 13 and the other end holds pins engaging with a plurality of hollows on the outer surface of the detent lever 21 and presses the pins towards the hollows, a parking rod 23 connected with the detent lever 21, and a parking ball 25 driven by a cam 24 connected to the parking rod 23 to rotate together and pivoted to the oil pan attaching part 13. When the manual shift 18 is in the position P, the parking ball 25 engages the parking gear connected to the output shaft of the transmission and so rotation of the output shaft is prevented.

A hollow shift-locking shaft 27 is located above the manual shaft 18 and is disposed parallel to the manual shaft 18. The shift-locking shaft 27 is rotatably supported by the side wall 16 of the oil pan attaching part 13. A shift-locking shaft 26 is rotatably supported inside the shift-locking shaft 27 so that the two shift-locking shafts 26, 27 are coaxial. One end of the shift-locking shaft 27 projects outside the oil pan attaching part 13 and one end of the shift-locking shaft 26 projects beyond the projecting end of the shift-locking shaft 27. The shift-locking shaft 26 forms a first shift-locking shaft, and the hollow shift-locking shaft 27 forms a second shift-locking shaft. The first shift-locking shaft 26 and the second shift-locking shaft 27 are parallel to one another and to the manual shaft 18, but are non-coaxially arranged with respect to the manual shaft 18.

The projecting end of the first shift-locking shaft 26 is connected with a shift-locking lever 28 so that the two rotate together. The free end of the shift-locking lever 28 is mechanically connected with a brake pedal 50 through a cable 51. The first shift-locking shaft 26 rotates from a first rotation position (rotation position P1 shown in FIG. 3) to a second rotation position (rotation position P2 shown in FIG. 3) by virtue of the operation of the brake pedal 50.

Similarly, one end of the hollow second shift-locking shaft 27 is connected with a shift-locking lever 29 so that the two rotate together. The free end of the shift-locking lever 29 is mechanically connected with a key cylinder 60 for receiving an ignition key (not shown) through a cable 61. The second shift-locking shaft 27 rotates from the first rotation position (rotation position P3 shown in FIG. 4) to the second rotation position (rotation position P4 shown in Pig.4) by virtue of the operation of the ignition key from the lock position to the on position.

At the inside of the oil pan attaching part 13 adjacent the one side wall 16, the manual shaft 18 is connected with a pair of locked members 30, 31 so that the locked members 30, 31 rotate together with the manual shaft 18. Also, the first shift locking shaft 26 is connected with a lock member 32 so that the lock member 32 rotates together with the shift locking shaft 26, and the second shift-locking shaft 27 is connected with a lock member 33 so that the lock member 33 rotates together with the second shift locking shaft 27.

When the manual shaft 18 is positioned at the position P and the shift-locking shaft 26 is positioned at the first rotation position P1 shown in FIG. 3, the rotation of the locked member 30 in the clockwise direction is prevented by engagement of the top of the locked member 30 with the top of the lock member 32 (i.e., through engagement of a projection of the locked member 30 with a projection of the lock member 32). Thus, rotation of the manual shaft 18 from the rotation position P to the rotation position R is prevented.

Figure 4:
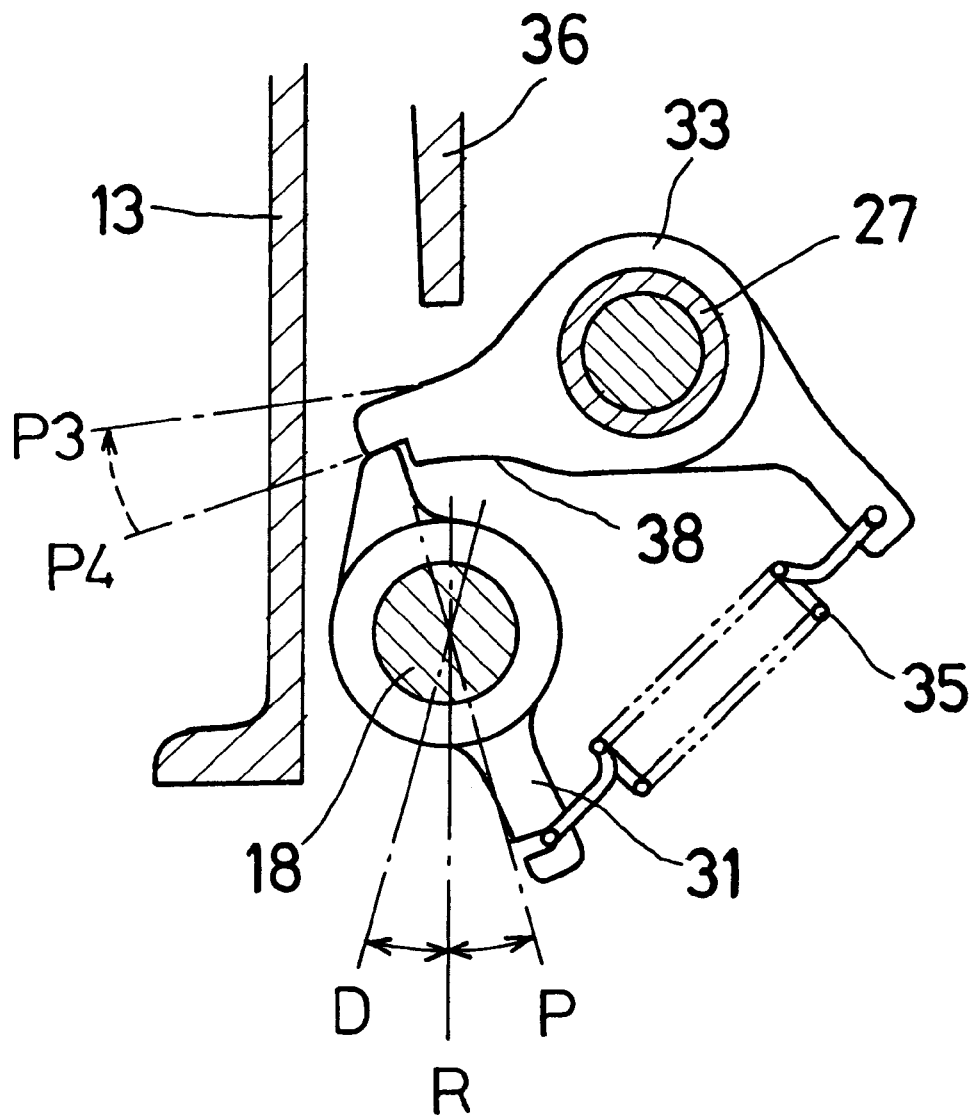
FIG. 4 is a cross-sectional view showing the engagement condition between the locked member and the lock member associated with the hollow shift-locking shaft.

Similarly, when the manual shaft 18 is in the rotation position P and the shift-locking shaft 27 is in the first rotation position P3 shown in FIG. 4, rotation of the locked member 31 in the clockwise direction is prevented by engagement of the top of the locked member 31 with the top of the lock member 33 (i.e., through engagement of a projection of the locked member 31 with a projection of the lock member 33).

Figure 5:
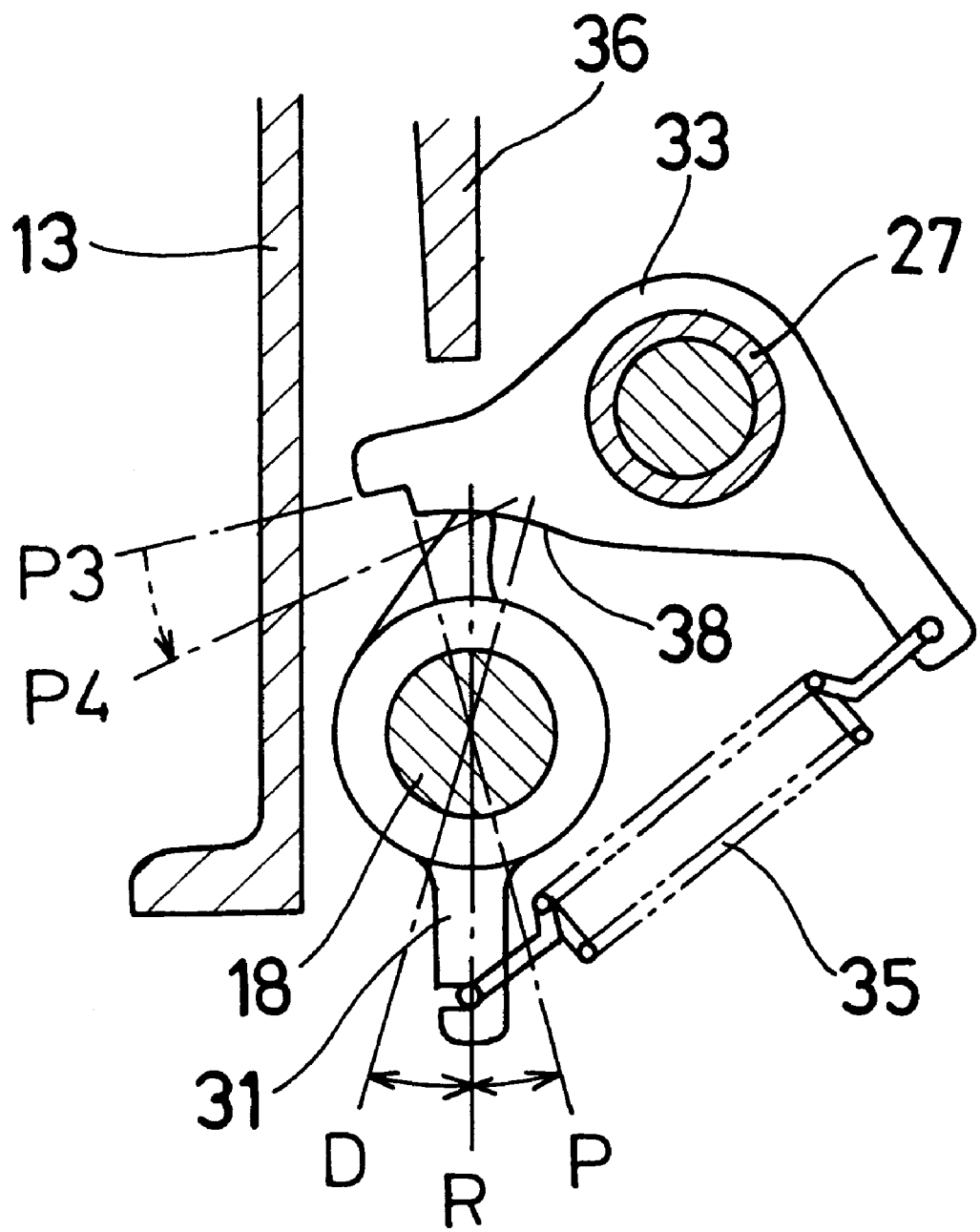
FIG. 5 is a cross-sectional view of a first embodiment showing the disengaged condition between the locked member and the lock member.

Further, when the manual shaft 18 is in the rotation position P and the shift-locking shaft 27 is in the second rotation position P4 shown in FIG. 5, rotation of the locked member 31 in the clockwise direction is permitted by virtue of the disengagement of the top of the locked member 31 with the top of the lock member 33 (i.e., through disengagement of the projection of the locked member 31 with the projection of the lock member 33). Thus, rotation of the manual shaft 18 from the rotation position P to the rotation position R or D is permitted.

Similarly, when the manual shaft 18 is in the rotation position P and the shift-locking shaft 26 is in the second rotation position P2, rotation of the locked member 30 in the clockwise direction is permitted as a result of the disengagement of the top of the locked member 30 with the top of the lock member 32 (i.e., through disengagement of the projection of the locked member 30 with the projection of the lock member 32).

The lock member 32 is urged or pressed by a torsion spring 34 having one end attached to the oil pan attaching part and other end attached to the lock member 32. The torsion spring 34 applies an urging force in a direction tending to cause the lock member 32 to disengage from the lock member 30 (i.e., tending to urge the lock member 32 in the clockwise direction). The lock member 33 is urged or pressed by a pull spring 35 having one end attached to the locked member 31 and other end attached to the lock member 33. The pull spring 35 applies an urging force in a direction tending to cause the lock member 33 to disengage from the lock member 31 (i.e., tending to urge the lock member 33 in the clockwise direction).

Figure 6:
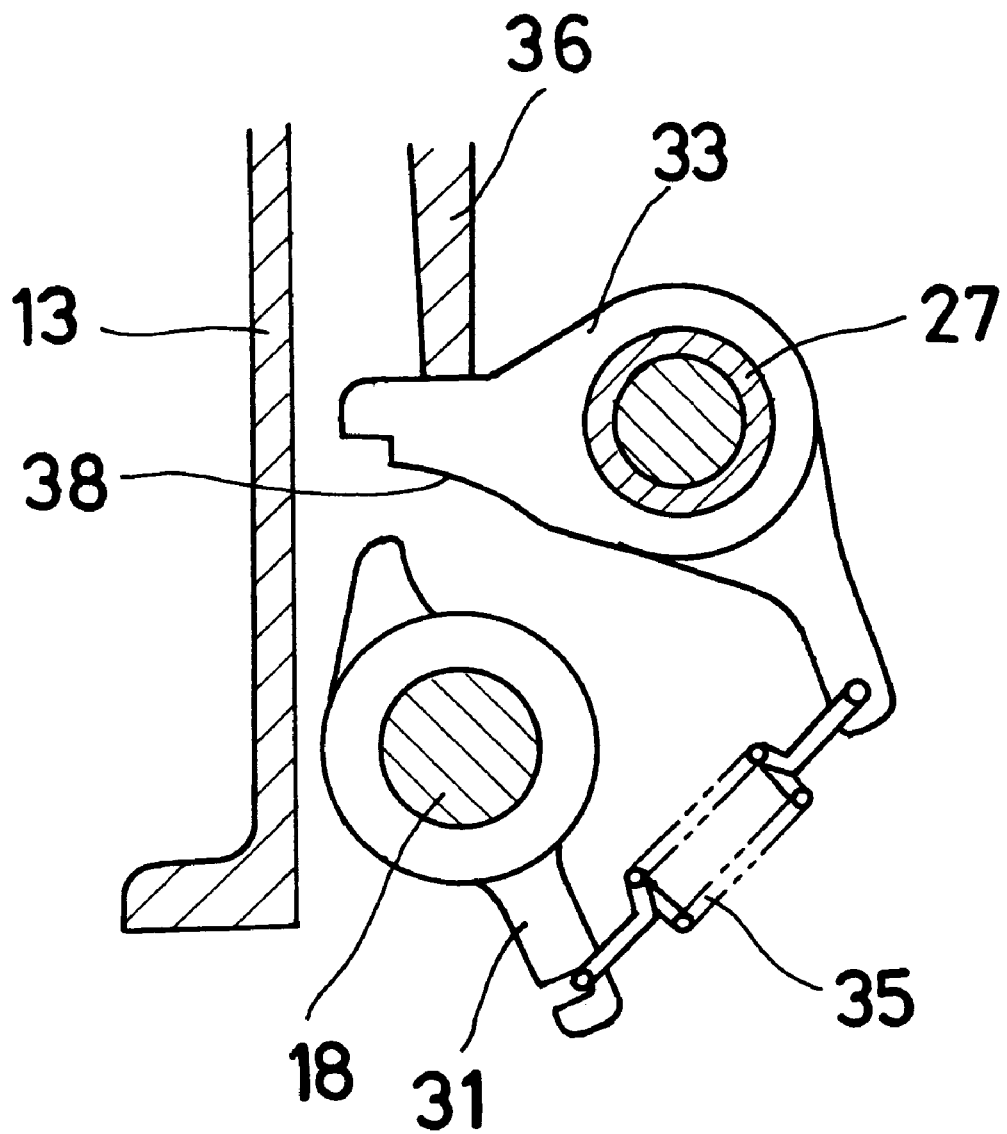
FIG. 6 is a cross-sectional view of a first embodiment showing the relationship between the lock member and the stopper.

A rib-like stopper 36 shown in FIGS. 3–6 is formed at the cylindrical portion 12 and extends downward to prevent excess rotation of the lock member 32 associated with the urging force of the spring 34 and to prevent excess rotation of the lock member 33 associated with the urging force of the spring 35. In the condition in which the lock members 32, 33 are contacting the stopper 36, the springs 34, 35 are bent. FIG. 6 shows the condition in which the lock member 33 is contacting the stopper 36.

As an alternative to the above-described construction, it is possible to mechanically connect the shift-locking shaft 26 and the key cylinder 60, and mechanically connect the shift-locking shaft 27 and the brake pedal 50.

According to the shift-locking device of the present invention shown in FIGS. 1–6, the locked members 30, 31 engage the lock members 32, 33 when the shift lever moves from the drive position or the reverse position to the parking position, and so the rotation of the manual shaft 18 from the rotation position P to the rotation position R or D is prevented. Accordingly, the shift lever cannot shift from the parking position to the reverse position or the drive position.

If the brake pedal 50 is operated in this condition, the lock member 32 and the locked member 30 become disengaged from one another through rotation of the lock member 32. Also, if the ignition key is inserted in the key cylinder 60 and moved from the lock position to the on position, the lock member 33 and the locked member 31 become disengaged from one another by rotation of the lock member 33. Accordingly, the rotation of the manual shaft 18 from the rotation position P to the rotation position R or D is permitted, and so the shift lever can shift from the parking position to the reverse position or the drive position.

FIGS. 7–11 show a second embodiment of the shift-locking device that differs from the first embodiment shown in FIGS. 1–6. Many of the features associated with the second embodiment are the same as those associated with the first embodiment and so a detailed description of those features will not be repeated here.

Figure 7:
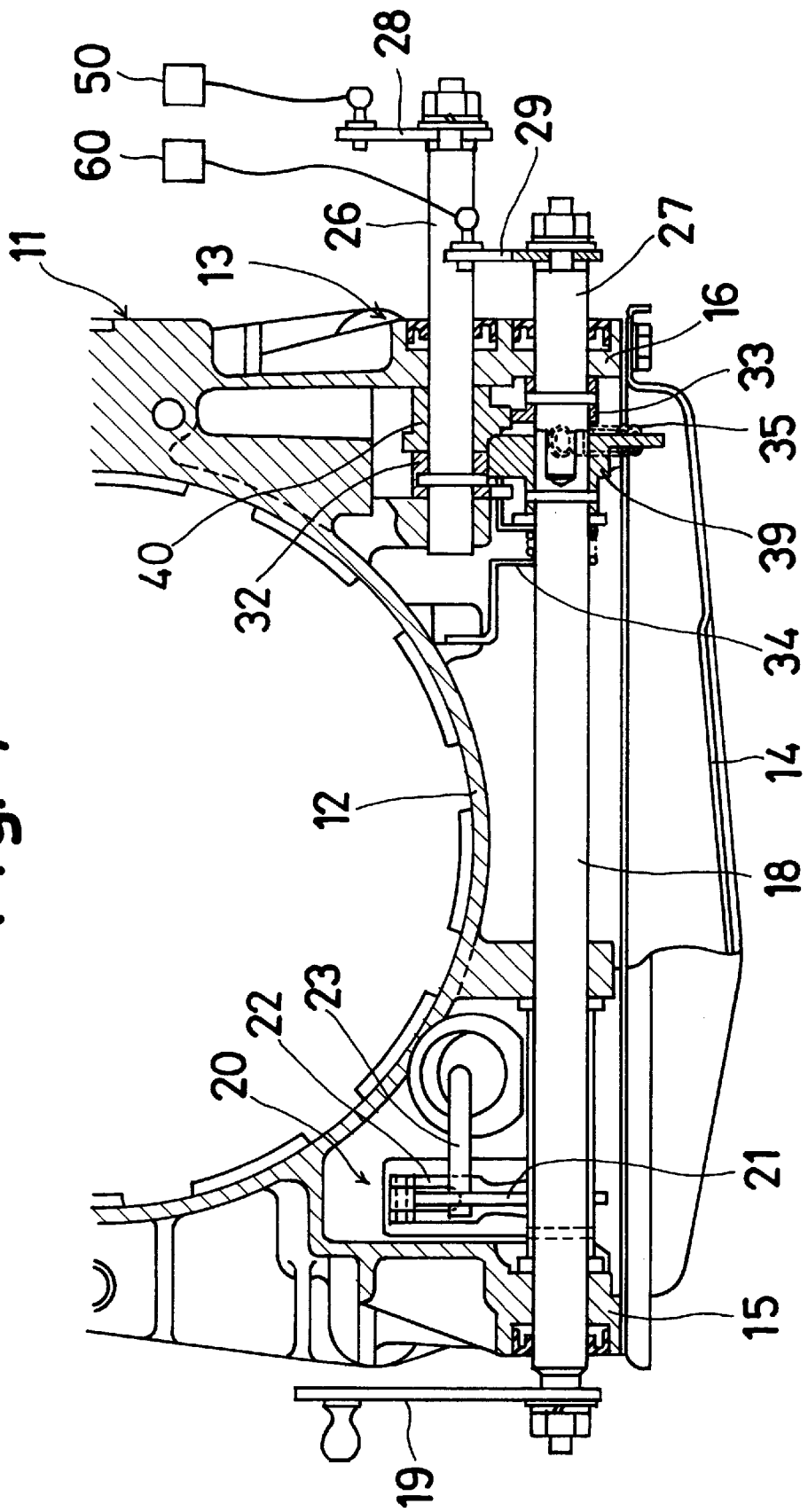
FIG. 7 is a cross-sectional view of a second embodiment of the shift-locking device according to the present invention.
Figure 8:
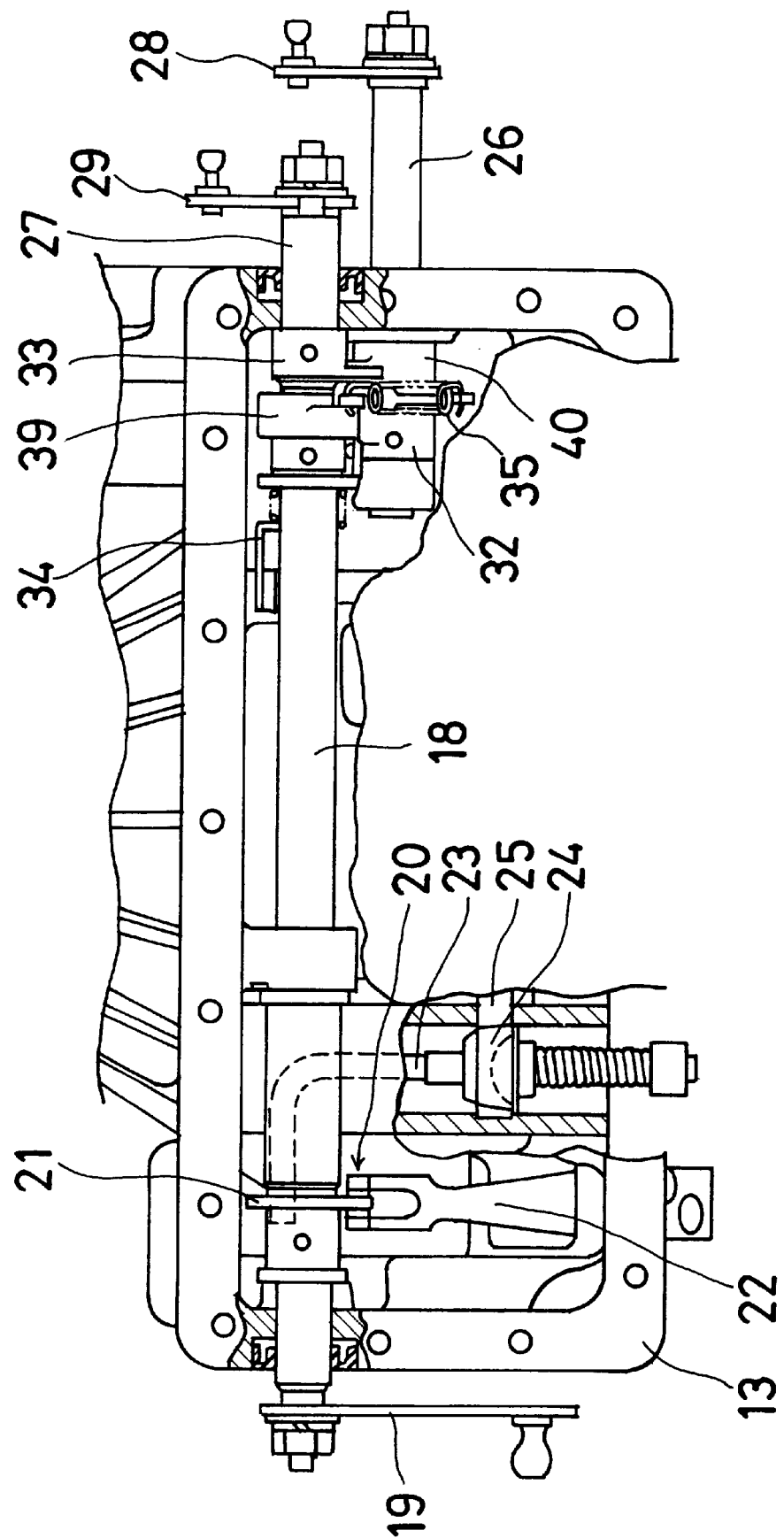
FIG. 8 is a bottom view of the shift-locking device in FIG. 7 with the oil pan removed.

One difference associated with the first embodiment involves, as shown in FIGS. 7 and 8, rotatably supporting the manual shaft 18 between the side wall 15 and the supporting portion 17, and arranging the second shift-locking shaft 27 coaxially and in adjoining relation to the manual shaft 18. The first shift-locking shaft 26 is rotatably supported by the side wall 16. The shift-locking shafts 26, 27 may be made solid.

Figure 9:
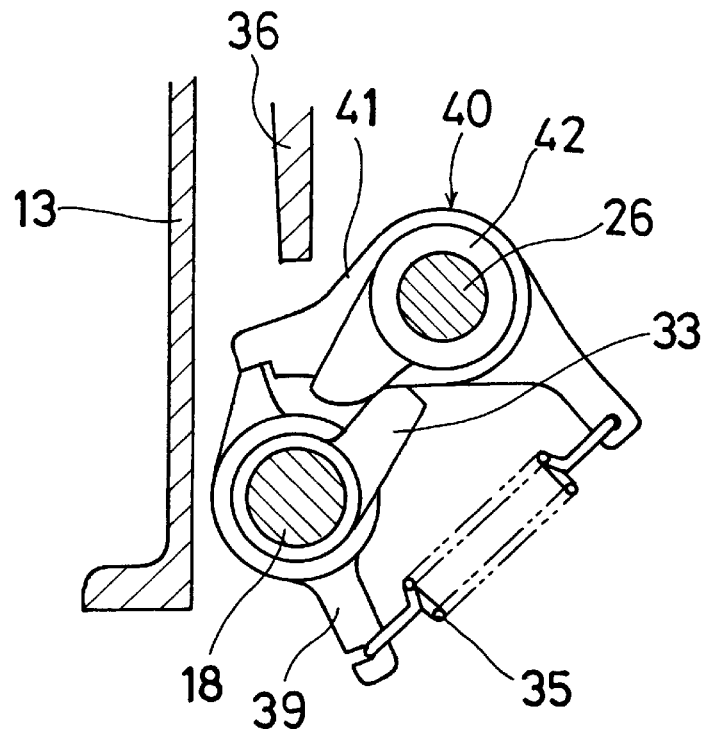
FIG. 9 is a cross-sectional view showing the engagement condition between the locked member and the floating lock member in the second embodiment of the shift-locking device shown in FIG. 7.
Figure 10:
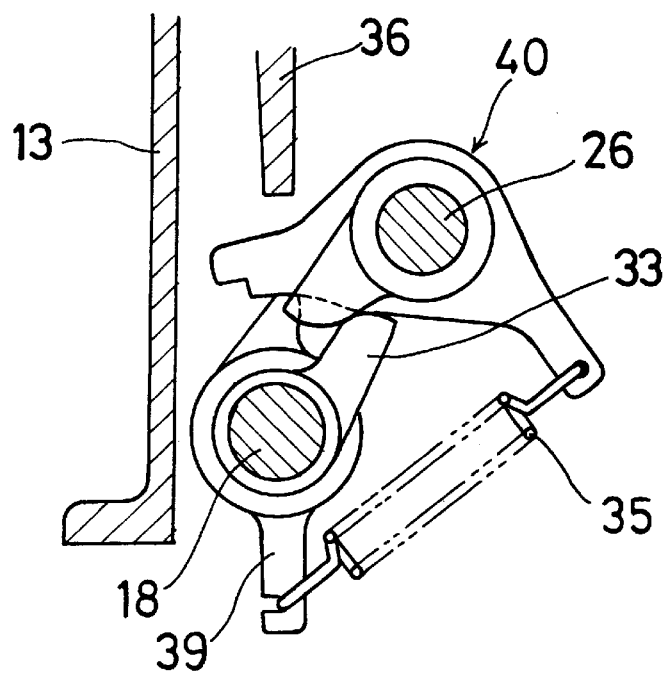
FIG. 10 is a cross-sectional view showing the disengagement condition between the locked member and the floating lock member in the second embodiment of the shift-locking device shown in FIG. 7.
Figure 11:
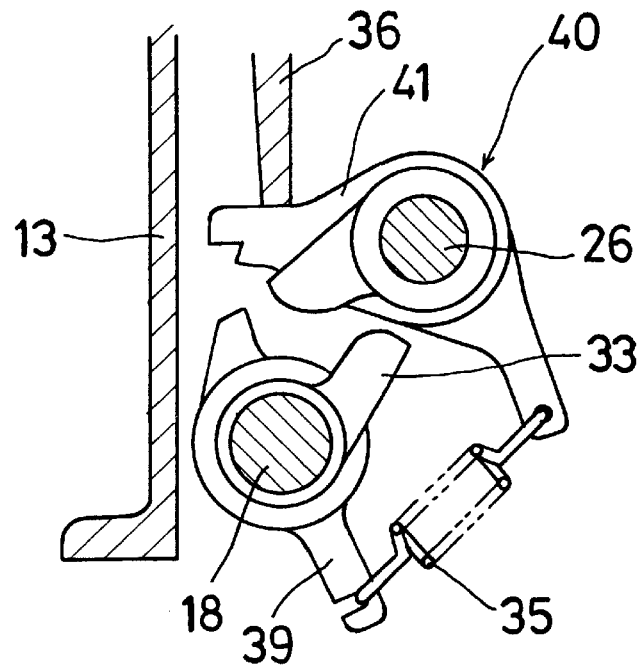
FIG. 11 is a cross-sectional view of a second embodiment showing the arrangement of the floating lock member and the stopper in the second embodiment of the shift-locking device shown in FIG. 7.

Another difference involves, as shown in FIGS. 7–11, using a single locked member 39 as the locked member that rotates together with the manual shaft 18, with both the lock member 32 that rotates together with the shift-locking shaft 26 and the floating lock member 40 that is supported on and rotatable with respect to the shift-locking shaft 26 being adapted to engage or disengage the locked member 39. The rotation of the floating lock member 40 is controlled by the lock member 33 rotating together with the shift-locking shaft 27. The floating lock member 40 includes one part 41 to engage the locked member 39 and another part 42 to engage the lock member 33 as shown in FIGS. 9–11.

A further difference involves, as shown in FIGS. 9 to 11, the spring 35 being interposed in an expandable manner between the locked member 39 and the floating lock member 40, with excess rotation of the floating lock member 40 by the urging force of the spring 35 being prevented by the rib-like stopper 36.

With respect to the shift locking device of the present invention shown in FIGS. 7–11, when the shift lever moves from the drive position or the reverse position to the parking position, the rotation of the manual shaft 18 from the rotation position P to the rotation position R or D is prevented by engagement of the locked member 39, the lock member 32 and the floating lock member 40. Accordingly, the shift lever cannot shift from the parking position to the reverse position or the drive position.

If the brake pedal 50 is operated in this condition, the lock member 32 and the locked member 39 assume a disengaged condition by rotation of the lock member 32. Also, if the ignition key inserted in the key cylinder 60 is moved from the lock position to the on position, the floating lock member 40 and the locked member 39 assume the disengaged condition by rotation of the lock member 33 (i.e., the rotation of the second shift-locking shaft 27 causes the part 42 to be moved by the lock member 33, thus moving the floating lock member 40). Accordingly, the rotation of the manual shaft from the rotation position P to the rotation position R or D is permitted. The shift lever can thus shift from the parking position to the reverse position or the drive position.

Figure 12:
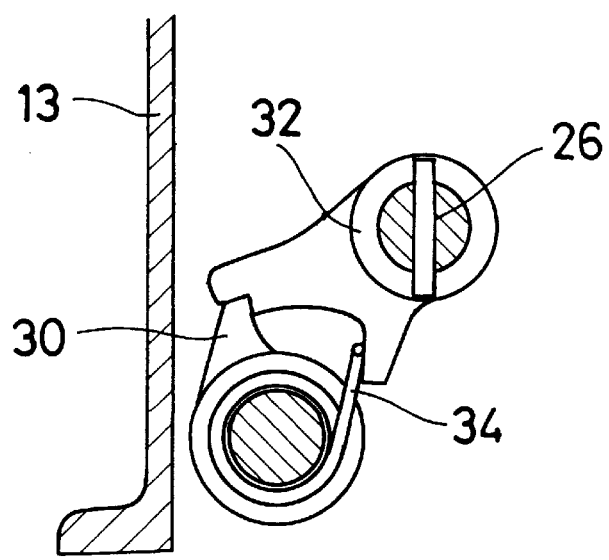
FIG. 12 is a cross-sectional view of the engagement condition between the lock member and the locked member in which the pressing direction of one of the springs shown in FIG. 1 is reversed or inversed.
Figure 13:
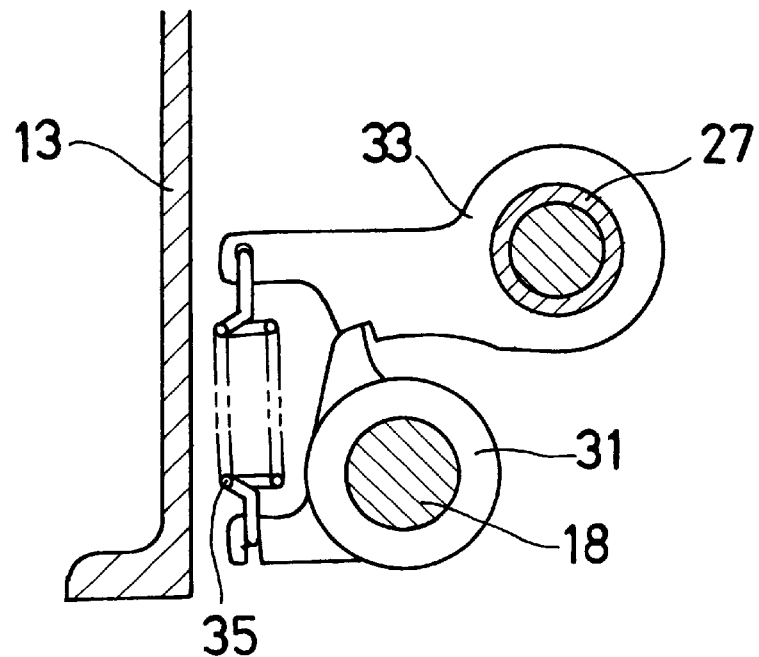
FIG. 13 is a cross-sectional view of the engagement condition between the lock member and the locked member in which the pressing direction of the other spring shown in FIG. 1 is reversed or inversed.
Figure 14:
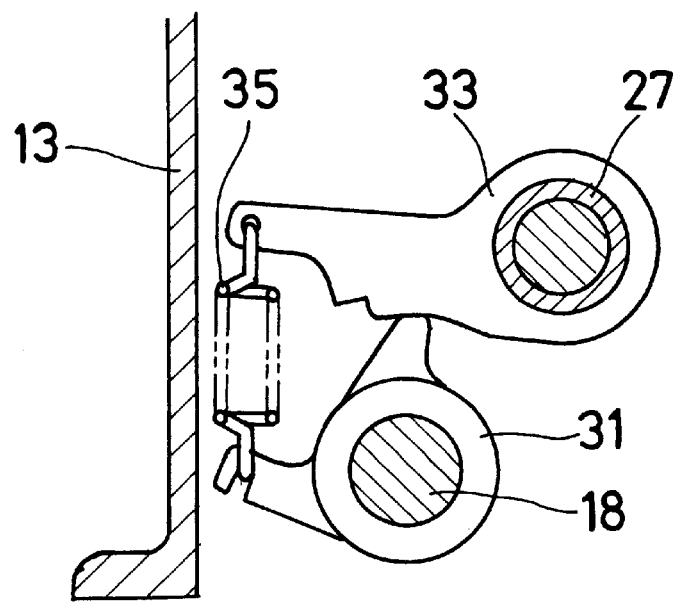
FIG. 14 is a cross-sectional view of the shift-locking device in FIG. 12 showing the disengagement condition between the lock member and the locked member.

With respect to the embodiment of the shift locking device shown in FIGS. 1–7, the lock members 32, 33 are pressed or urged by the springs 34, 35 to release the engagement between the locked members 30, 31 and the lock members 32, 33. However, as shown in FIGS. 12–14, it is possible to construct the device so that the springs press or urge the lock members 32, 33 to engage the locked members 30, 31 with the lock members 32, 33.

Similarly, with respect to the shift locking device shown in FIGS. 8–11, it is possible to press or urge the lock member 32 and the floating member 40 to engage the locked member 39 with the lock member 32 and the floating member 40.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A shift-locking device for a vehicle transmission comprising;
   a manual shaft rotatably installed at a transmission case and mechanically connected with a shift lever for rotating between a first position, a second position and a third position through operation of the shift lever between a parking position, a reverse position and a drive position, said manual shaft being mechanically connected with a parking control mechanism located within the transmission case;
   a shift-locking shaft connected to a brake pedal for rotating from a first position to a second position upon operation of the brake pedal;
   a locked member provided on the manual shaft;
   a lock member provided on the shift-locking shaft for engaging the locked member when the shift-locking shaft is in the first position; and
   a spring urging the shift-locking shaft to the second position to release engagement between the locked member and the lock member.

2. The shift-locking device for a vehicle transmission according to claim 1, wherein said shift-locking shaft is a first shift-locking shaft, and including a second shift-locking shaft connected to a key cylinder for rotating from a first position to a second position corresponding to operating the key cylinder from a lock position to a start position, said lock member being a first lock member, and including a second lock member provided on the second shift-locking shaft for engaging the locked member when the second shift-locking shaft is in the first position.

3. The shift-locking device for a vehicle transmission according to claim 2, wherein the manual shaft, the first shift-locking shaft and the second shift-locking shaft are disposed in an oil-pan attaching part formed at a bottom side of the transmission case, the oil-pan attaching part having first and second oppositely disposed side walls, the first shift-locking shaft and the second shift-locking shaft passing through the first side wall of the oil-pan attaching part and the manual shaft passing through the second side wall of the oil-pan attaching part, the locked member, the first lock member and the second lock member being disposed adjacent one of the first and second side walls of the oil-pan attaching part, and the parking control mechanism being disposed adjacent the other of the first and second side walls of the oil-pan attaching part.

4. The shift-locking device for a vehicle transmission according to claim 2, wherein the first shift-locking shaft is positioned parallel to the manual shaft.

5. The shift-locking device for a vehicle transmission according to claim 2, wherein the first shift-locking shaft is positioned coaxial to the manual shaft.

6. The shift-locking device for a vehicle transmission according to claim 5, wherein the first lock member engages the locked member through a floating lock member provided on the second shift-locking shaft when the first shift-locking shaft is in the first position.

7. The shift-locking device for a vehicle transmission according to claim 4, wherein said spring is a first spring urging the first lock member to release the locked member to permit rotation of the locked member, and including a second spring pressing the second lock member to release the locked member to permit rotation of the locked member.

8. The shift-locking device for a vehicle transmission according to claim 4, wherein said spring is a first spring urging the first lock member in a direction which prevents the locked member from rotating, and including a second spring urging the second lock member in a direction which prevents the locked member from rotating.

9. The shift-locking device for a vehicle transmission according to claim 6, wherein said spring is a first spring urging the floating member to release the locked member for rotation, and including a second spring urging the second lock member to release the locked member for rotation.

10. The shift-locking device for a vehicle transmission according to claim 6, wherein said spring is a first spring urging the floating member to fix the locked member for not rotating, and including a second spring urging the second lock member to fix the locked member for not rotating.

11. The shift-locking device for a vehicle transmission according to claim 2, wherein said spring is a first spring operatively associated with the first lock member for urging the first lock member, a second spring operatively associated with the second lock member for urging the second lock member, and a rib-shaped stopper formed on the transmission case for preventing excessive rotation of the first lock member by the first spring and excessive rotation of the second lock member by the second spring.

12. The shift-locking device for a vehicle transmission according to claim 9, including a rib-shaped stopper formed on the transmission case for preventing excessive rotation of the floating lock member and the second lock member by the first spring and the second spring.

13. A shift-locking device for a vehicle transmission comprising;
   a manual shaft rotatably installed on a transmission case and connected to a shift lever for rotating between a first position, a second position and a third position through operation of the shift lever between a parking position, a reverse position and a drive position, said manual shaft being connected with a parking control mechanism;
   a shift-locking shaft connected to one of a brake pedal and a key cylinder for rotating from a first position to a second position upon operation of the brake pedal or the key cylinder;
   a locked member provided on the manual shaft;
   a lock member provided on the shift-locking shaft for engaging the locked member when the shift-locking shaft is in the first position; and
   a spring operatively associated with the shift-locking shaft to urge the shift-locking shaft towards one of said first and second positions.

14. The shift-locking device for a vehicle transmission according to claim 13, wherein said shift-locking shaft is a first shift-locking shaft connected to the brake pedal, and including a second shift-locking shaft connected to the key cylinder for rotating from a first position to a second position corresponding to operating the key cylinder from a lock position to a start position, said lock member being a first lock member, and including a second lock member provided on the second shift-locking shaft for engaging the locked member when the second shift-locking shaft is in the first position.

15. The shift-locking device for a vehicle transmission according to claim 14, wherein the manual shaft, the first shift-locking shaft and the second shift-locking shaft are disposed in an oil-pan attaching part formed at a bottom side of the transmission case.

16. The shift-locking device for a vehicle transmission according to claim 15, wherein the oil-pan attaching part has first and second oppositely disposed side walls, the first shift-locking shaft and the second shift-locking shaft passing through the first side wall of the oil-pan attaching part and the manual shaft passing through the second side wall of the oil-pan attaching part, the locked member, the first lock member and the second lock member being disposed adjacent one of the first and second side walls of the oil-pan attaching part, and the parking control mechanism being disposed adjacent the other of the first and second side walls of the oil-pan attaching part.

17. The shift-locking device for a vehicle transmission according to claim 14, wherein said spring is a first spring urging the first lock member to release the locked member to permit rotation of the locked member, and including a second spring pressing the second lock member to release the locked member to permit rotation of the locked member.

18. The shift-locking device for a vehicle transmission according to claim 14, wherein said spring is a first spring urging the first lock member in a direction which prevents the locked member from rotating, and including a second spring urging the second lock member in a direction which prevents the locked member from rotating.

19. The shift-locking device for a vehicle transmission according to claim 13, wherein the shift-locking shaft is positioned parallel to the manual shaft.

20. The shift-locking device for a vehicle transmission according to claim 13, wherein the shift-locking shaft is positioned coaxial to the manual shaft.

* * * * *